Oct. 22, 1968 R. R. REISER 3,407,288
DECADE
Filed June 25, 1965
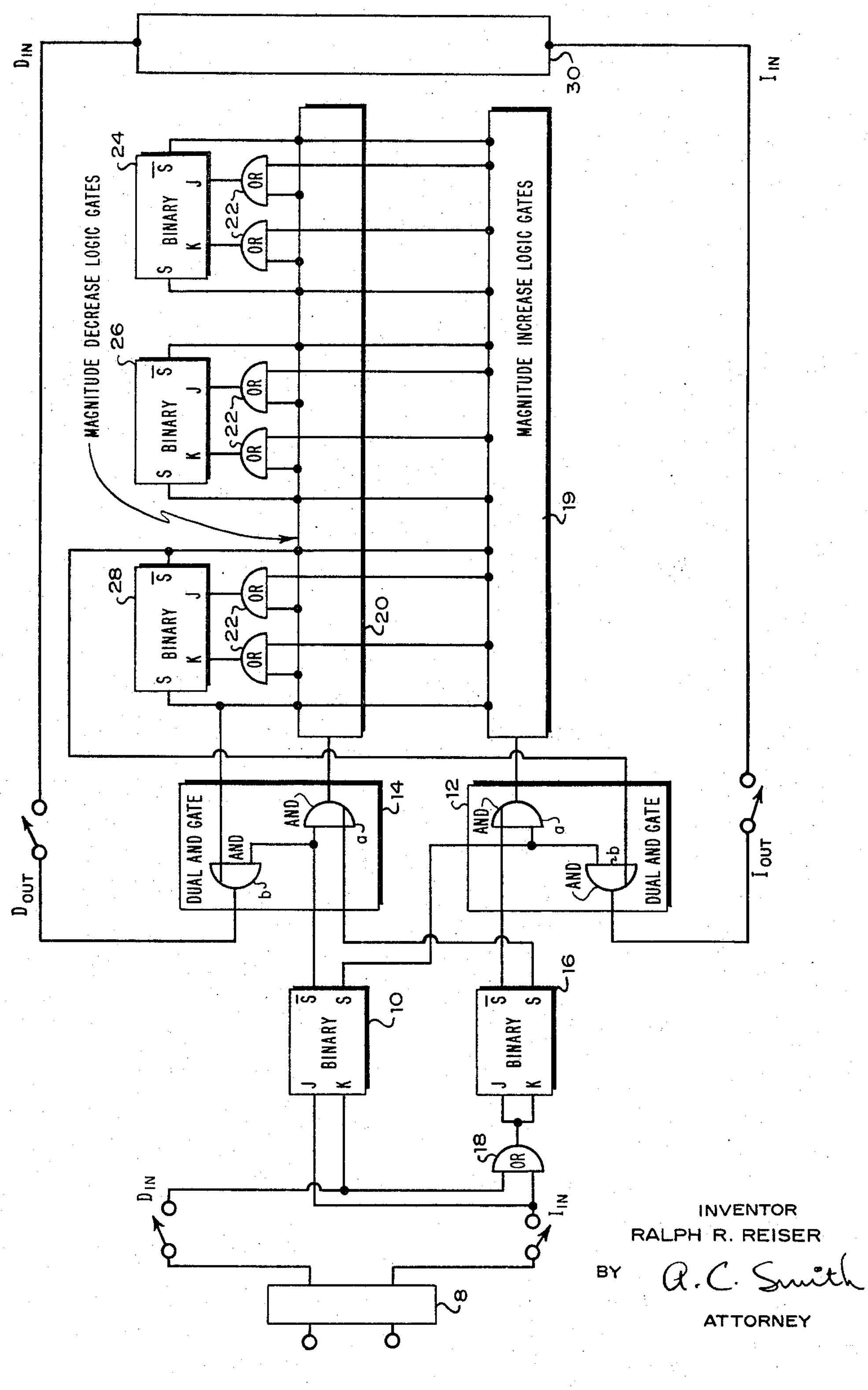
INVENTOR
RALPH R. REISER
BY A. C. Smith
ATTORNEY

United States Patent Office 3,407,288
Patented Oct. 22, 1968

3,407,288
DECADE

Ralph R. Reiser, San Jose, Calif., assignor to Hewlett-Packard Company, Palo Alto, Calif., a corporation of California Filed June 25, 1965, Ser. No. 466,952
6 Claims. (Cl. 235—92)

ABSTRACT OF THE DISCLOSURE

Four bistable switching elements are provided for advancing in one direction through a set of counting states in response to input signals applied to a first input and for advancing in the opposite direction through this set of counting states in response to input signals applied to a second input. The first of these switching elements is connected to both inputs for changing states in response to each input signal. A control circuit is connected to each input and is responsive to each input signal applied to the first input during one state of the first switching element for activating one set of logic elements to change the state of at least one of the other three switching elements. This control circuit is also responsive to each input signal applied to the second input during the other state of the first switching element for activating another set of logic elements to change the state of at least one of the other three switching elements. In response to these changes in state, selected ones of the logic elements of each set are made ready for activation by subsequent application of an input signal to one of the inputs during the corresponding state of the first switching element.

This invention relates to reversible decades for counting applied input pulses in either one of a magnitude increase and a magnitude decrease direction.

It is the principal object of this invention to provide an improved dual input reversible decade that is faster in frequency.

Another object of this invention is to provide an improved reversible decade that obtains counting direction information directly from the pulses to be counted. Thus, the time required for reversing a number of such decades connected in cascade is the same as it is for a single decade.

In accordance with the illustrated embodiment of this invention, there is provided a reversible decade having two inputs. This reversible decade is responsive to pulses applied at one of the inputs for counting in the magnitude increase (1, 2, 3, etc.) direction, and to pulses applied at the other input for counting in the magnitude decrease (9, 8, 7, etc.) direction. The reversible decade includes a first binary connected for sampling these inputs to determine which one receives an input pulse and, accordingly, to make a corresponding pair of AND gates ready for activation. A second binary which is connected to change states in response to an input pulse applied at either input of the reversible decade assigns the count as being an even or an odd number and in response to two input pulses provides a driving pulse for activating one gate of the pair of AND gates made ready for activation. The activated AND gate drives a corresponding set of logic gates which is connected to three additional binaries for switching the binaries in a manner to advance the selected coded logic in the corresponding magnitude increase or magnitude decrease direction. One of these three last-mentioned binaries is connected to drive the other gate of the pair of AND gates made ready for activation when the count exceeds the counting capacity of the reversible decade.

Other and incidental objects of this invention will become apparent from a reading of this specification and an inspection of the accompanying drawing which is a block diagram of a reversible decade according to this invention.

Referring now to the drawing, the reversible decade is provided with magnitude increase and magnitude decrease inputs, $I_{in}$ and $D_{in}$, respectively. By applying the input pulses to be counted, which input pulses are to increase or decrease the magnitude stored in the reversible decade, to the corresponding $I_{in}$ or $D_{in}$ input the decade obtains counting direction information directly from the input pulses. Thus, the time required to reverse the counting direction of a number of such reversible decades connected in cascade is no greater than the time required to reverse the counting direction of a single reversible decade. A counting direction control circuit 8 such as that described in my copending patent application Ser. No. 466,727 filed on June 24, 1965, and issued on Jan. 10, 1967, as U.S. Patent 3,297,859 entitled Counting Direction Control Circuit for Use With Reversible counters may be connected to drive the $I_{in}$ and $D_{in}$ inputs in this manner.

The reversible decade includes five binaries of similar construction. These binaries are conventional J–K flip-flops each having two inputs, J and K, and two complementary outputs, S and $\overline{S}$. Each binary has two stable states, one occurring when the J input is in the "1" state so that the $\overline{S}$ output is also in the "1" state and the S output is in the "0" or complementary state, and the other occurring when the K input is in the "1" state so that the digital condition of the S and $\overline{S}$ bar outputs is reversed. Binary 10 is connected for sampling the magnitude increase and magnitude decrease inputs $I_{in}$ and $D_{in}$ of the reversible decade to determine at which input a pulse to be counted is applied and to generate a "1" signal at the corresponding output S or $\overline{S}$. The S and $\overline{S}$ outputs of binary 10 are connected to the control inputs of dual AND gates 12 and 14, respectively, so that this "1" signal will make the appropriate one of the dual AND gates ready for activation. Each of the dual AND gates 12 and 14 comprises two AND gates *a* and *b* having common control inputs connected to one of the S and $\overline{S}$ outputs of binary 10. Thus, for example, a pulse applied to the magnitude increase input $I_{in}$ of the reversible decade, and, hence, to the J input of binary 10, causes the binary 10 to generate a "1" signal at its S output, thereby making both AND gates *a* and *b* of dual AND gate 12 ready for activation. Similarly, binary 10 is responsive to a pulse applied to the decrease magnitude input of the reversible decade for making both AND gates *a* and *b* of the dual AND gate 14 ready for activation. The dual AND gates 12 and 14 may be constructed as described in my co-pending patent application Ser. No. 470,734 entitled "Gate" and filed on or about July 9, 1965.

The J and K inputs of binary 16, are connected in common to the output of OR gate 18 which is connected to receive pulses from both the magnitude increase and magnitude decrease inputs $I_{in}$ and $D_{in}$. Application of a pulse from either the $I_{in}$ or $D_{in}$ input to both of the J and K inputs of binary 16 simultaneously in this manner causes binary 16 to change states. Binary 16 is therefore used to assign the count as being an even or an odd number and, since it takes two input pulses for binary 16 to produce an output driving pulse, to divide the input pulses to be counted by two. The S and $\overline{S}$ outputs of binary 16 are connected for supplying driving pulses to AND gates 14*a* and 12*a*, respectively, to activate the one made ready for activation by binary 10. The AND gate made ready for activation is activated by the leading edge of the driving pulse generated by the division-by-two binary 16 depending on whether the count assigned thereby is even or odd as is presently well-known to persons skilled in this particular art. Binaries 10 and 16 are constructed so that when both binaries are triggered simultaneously, binary 10 will make the corresponding AND gate 12*a* or 14*a* ready for activation before it is driven by the leading edge of the driving pulse generated by binary 16.

The activated AND gate 12*a* or 14*a* drives a corresponding set of magnitude increase or magnitude decrease logic gates 19 or 20 which is connected thereto. Each of these sets of logic gates 19 and 20 comprises a plurality of AND gates directly connected by OR gates 22 to the division-by-five quinary which comprises binaries 24, 26, and 28. Binaries 24, 26, and 28 are connected to make selected ones of the logic gates ready for activation so that the next driving pulse from binary 16, which activates one of the AND gates 12*a* or 14*a* will also activate the selected logic gates made ready for activation and advance the coded logic. For example, a bi-quinary code such as the 1·2·2·4, the 1·2·4·8, or the "four R" code described in my co-pending patent application Ser. No. 468,900 filed on July 1, 1965 and issued on Feb. 20, 1969, as U.S. Patent 3,370,237 entitled Counting Circuit Employing Three Switching Devices Interconnected by Particular Logic Circuit for Operation in Predetermined Sequence, may be used. The set of magnitude increase logic gates 19 is connected to be responsive to activation of AND gate 12*a* for switching the binaries 24, 26, and 28 so as to advance the coded logic in the magnitude increase direction, thereby increasing the magnitude stored in the reversible decade. Similarly, the set of magnitude decrease logic gates 20 is connected to be responsive to activation or AND gate 14*a* for switching the binaries 24, 26, and 28 so as to advance the coded logic in the magnitude decrease direction, thereby decreasing the magnitude stored in the reversible decade. An important advantage of driving the binaries 24, 26, and 28 directly with the sets of magnitude increase and magnitude decrease logic gates 19 and 20 in this manner instead of utilizing conventional feedback schemes is that the logic gates have the time of one period of the incoming pulse repetition rate in which to be readied for activation before receiving a driving pulse. This allows the logic gates to completely recover and prevents deterioration of the driving pulses, which deterioration would otherwise occur at high counting rates, thereby increasing the counting speed of the reversible decade.

Each of the binaries 16, 24, 26, and 28 is provided for a different binary digit of the number of input pulses to be counted. The number of such binaries employed in the particular pulse counting apparatus desired will depend upon the required counting capacity for the application to be made of the pulse counting apparatus. AND gates 12*b* and 14*b* are each connected to a different output of the highest order binary 28 so that the AND gate 12*b* or 14*b* made ready for activation by binary 10 is activated by a "1" signal from the corresponding output S or $\overline{S}$ of binary 28. The outputs of AND gates 12*b* and 14*b* provide the magnitude increase and magnitude decrease outputs $I_{out}$ and $D_{out}$ of the reversible decade. These outputs $I_{out}$ and $D_{out}$ may be connected to drive another similar reversible decade 30. Thus, when the number of pulses to be counted is greater than the counting capacity of the reversible decade, the AND gate 12*b* or 14*b* which is made ready for activation by binary 10 is activated for driving the next decade by binary 28. A group of reversible decades cascaded in this manner requires no more time for reversing counting direction than is required for one reversible decade since the output pulses of the *n*th decade carry the counting direction information to the *n*+1 decade.

I claim:

1. Reversible pulse counting apparatus comprising:
two inputs with said counting apparatus providing a first predetermined counting operation in response to a pulse applied at one of said inputs and a second predetermined counting operation in response to a pulse applied at the other of said inputs;
a plurality of bistable switching elements, each being provided for a different binary digit of a number of input pulses to be counted;
a first set of logic elements being connected for switching at least one of said bistable switching elements to provide said first predetermined counting operation, and a second set of logic elements being connected for switching said one of the bistable switching elements to provide said second predetermined counting operation;
said one of the bistable switching elements being connected for making selected ones of the logic elements comprising said first and second sets ready for activation;
first gating means being connected for driving said first set of logic elements, and second gating means being connected for driving said second set of logic elements;
a sampling element connected to sample said inputs for determining at which input each input pulse to be counted is applied and for, accordingly, applying control signals to said first and second gating means to make the appropriation one ready for activation; and
another of said bistable switching elements being connected to change states in response to each input pulse to be counted, assign the count as an even or an odd number, and, accordingly, supply a driving signal for activating both the one of said first and second gating means made ready for activation by said sampling element and the selected ones of said logic elements made ready for activation by said one of the bistable switching elements.

2. A reversible pulse counting apparatus including a plurality of decades, each comprising:
two inputs with said counting apparatus providing a first predetermined counting operation in response to a pulse applied at one of said inputs and a second predetermined counting operation in response to a pulse applied at the other of said inputs;
a plurality of bistable switching elements, each being provided for a different binary digit of a number of input pulses to be counted;
a first set of logic elements being connected for switching selected ones of said bistable switching elements to provide said first predetermined counting operation, and a second set of logic elements being connected for switching said selected ones of the bistable switching elements to provide said second predetermined counting operation;
said selected bistable switching elements being connected for making selected ones of the logic elements comprising said first and second sets ready for activation;
a first pair of gates one of which is connected for driving said first set of logic elements, and a second pair of gates one of which is connected for driving said second set of logic elements;
a sampling element being connected to sample said inputs for determining at which input each input pulse to be counted is applied and for, accordingly, applying control signals to said first and second pairs of gates to make the appropriate pair ready for activation;
another of said bistable switching elements being connected to change states in response to each input signal, assign the count as an even or an odd number, and, accordingly, supply a driving signal for activating both the one gate of said pair of which is connected for driving said sets of logic gates and made ready for activation by said sampling element and said selected logic gates which are made ready for activation by said selected bistable switching elements; and one of said selected bistable switching elements being connected for activating the other gate of said pair made ready for activation when the count exceeds the counting capacity of the decade to drive another of said decades.

3. Signal counting apparatus comprising:

an input for receiving input signals to be counted;

a plurality of switching elements individually having two stable operating states and collectively having a plurality of stable counting states for use in counting the input signals applied to said input, each of said stable counting states comprising a different combination of the stable operating states of said plurality of switching elements;

one of said switching elements being connected to said input for changing stable operating states in response to each input signal applied to said input;

control means connected to said input and to said one switching element for being activated in response to each input signal applied to said input during a selected one of the stable operating states of said one switching element; and a set of logic elements connected between said control means and each of the others of said switching elements for controlling changes in the stable operating states of said other switching elements, at least one of said logic elements being activated for changing the stable operating state of at least one of said other switching elements in response to activation of said control means and to the stable operating state of at least one of said other switching elements;

whereby the stable counting state of said plurality of switching elements is changed in response to each input signal applied to said input.

4. Signal counting apparatus as in claim 3 wherein:

said control means includes a gate and means for connecting said gate to said input and to said one switching element, said gate being connected to said set of logic elements and being responsive to each input signal applied to said input during said selected one of the stable operating states of said one switching element for activating at least one of said logic elements to change the stable operating state of at least one of said other switching elements.

5. Signal counting apparatus comprising:

a first input for receiving input signals to be counted according to a first counting operation;

a second input for receiving input signals to be counted according to a second counting operation;

a plurality of switching elements individually having two stable operating states and collectively having a plurality of stable counting states for use in counting the input signals applied to said first and second inputs, each of said stable counting states comprising a different combination of the stable operating states of said plurality of switching elements;

one of said switching elements being connected to each of said first and second inputs for changing stable operating states in response to each input signal applied to said first and second inputs;

first control means connected to said first input and to said one switching element for being activated in response to each input signal applied to said first input during one of the stable operating states of said one switching element;

a first set of logic elements connected between said first control means and each of the others of said switching elements for controlling changes in the stable operating states of said other switching elements, at least one of the logic elements of said first set being activated for changing the stable operating state of at least one of said other switching elements in response to activation of said first control means and to the stable operating state of at least one of said other switching elements;

whereby the stable counting state of said plurality of switching elements is changed according to said first counting operation in response to each input signal applied to said first input; and second control means connected to said second input and to said one switching element for being activated in response to each input signal applied to said second input during the other of the stable operating states of said one switching element;

a second set of logic elements connected between said second control means and each of the others of said switching elements for controlling changes in the stable operating states of said other switching elements, at least one of the logic elements of said second set being activated for changing the stable operating state of at least one of said other switching elements in response to activation of said second control means and to the stable operating state of at least one of said other switching elements;

whereby the stable counting state of said plurality of switching elements is changed according to said second counting operation in response to each input signal applied to said second input.

6. Signal counting apparatus as in claim 5 wherein:

said first control means includes a first gate and means for connecting said first gate to said first input and to said one switching element, said first gate being connected to said first set of logic elements and being responsive to each input signal applied to said first input during said one of the stable operating states of said one switching element for activating at least one of the logic elements of said first set to change the stable operating state of at least one of said other switching elements; and said second control means includes a second gate and means for connecting said second gate to said second input and to said one switching element, said second gate being connected to said second set of logic elements and being responsive to each input signal applied to said second input during said other of the stable operating states of said one switching element for activating at least one of the logic elements of said second set to change the stable operating state of at least one of said other switching elements.

References Cited

UNITED STATES PATENTS

| | | | |
|---|---|---|---|
| 2,970,759 | 2/1961 | Lanning | 235—92 |
| 3,073,522 | 1/1963 | Bockemuehl | 235—92 |

MAYNARD R. WILBURN, *Primary Examiner.*

G. J. MAIER, *Assistant Examiner.*

U.S. DEPARTMENT OF COMMERCE
PATENT OFFICE
Washington, D.C. 20231

UNITED STATES PATENT OFFICE

CERTIFICATE OF CORRECTION

Patent No. 3,407,288 October 22, 1968

Ralph R. Reiser

It is certified that error appears in the above identified patent and that said Letters Patent are hereby corrected as shown below:

Column 2, line 29, "$\overline{S}$" should read -- S --; same line 29, "S" should read -- $\overline{S}$ --.

Signed and sealed this 24th day of February 1970.

(SEAL)
Attest:

Edward M. Fletcher, Jr.
Attesting Officer

WILLIAM E. SCHUYLER, JR.
Commissioner of Patents

[redacted]